No. 849,958. PATENTED APR. 9, 1907.
S. V. ABREGO.
STEAM SAWYER.
APPLICATION FILED MAY 6, 1905.
2 SHEETS—SHEET 1.
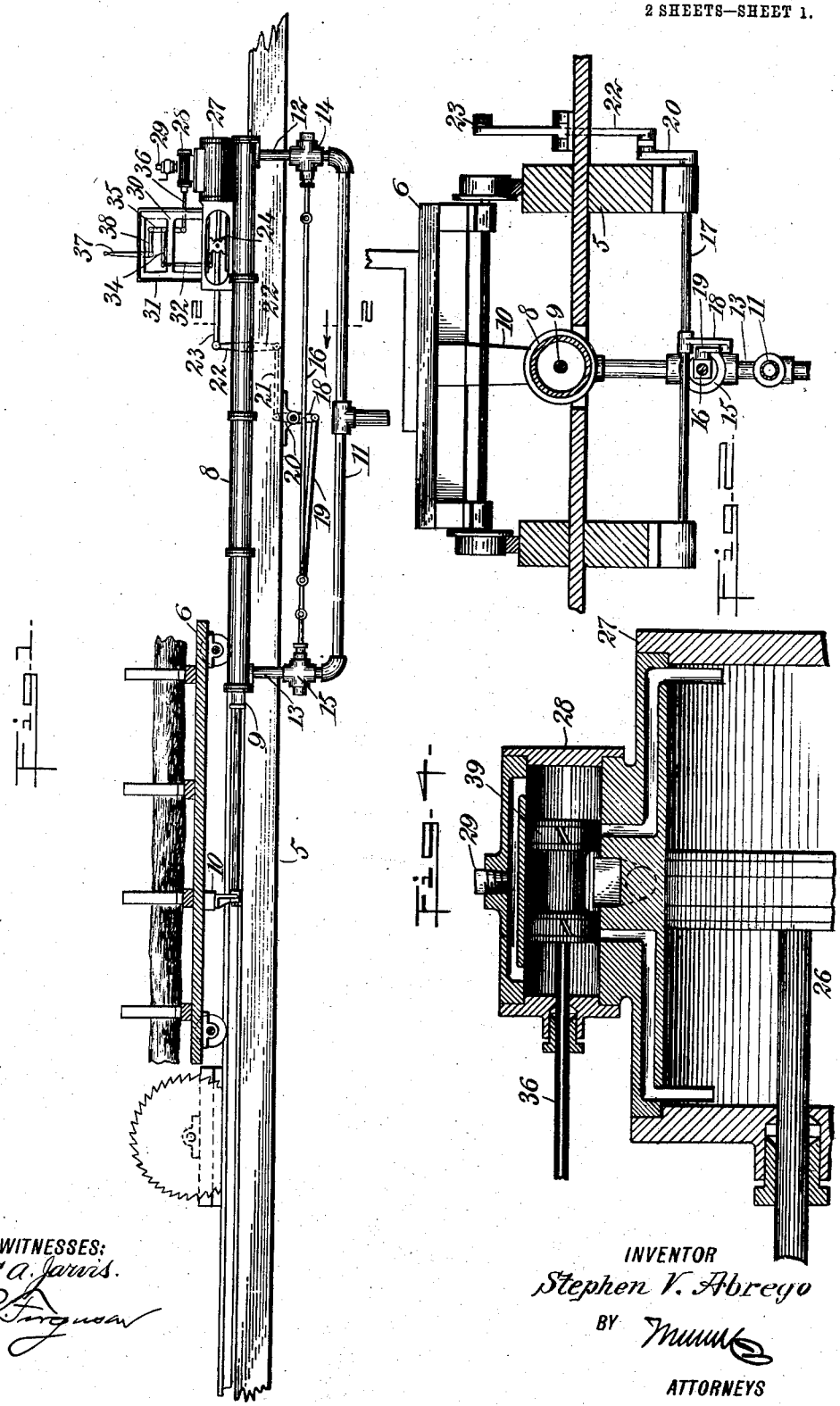
WITNESSES:
INVENTOR
Stephen V. Abrego
BY 
ATTORNEYS No. 849,958. PATENTED APR. 9, 1907.
S. V. ABREGO.
STEAM SAWYER.
APPLICATION FILED MAY 6, 1905.
2 SHEETS—SHEET 2.
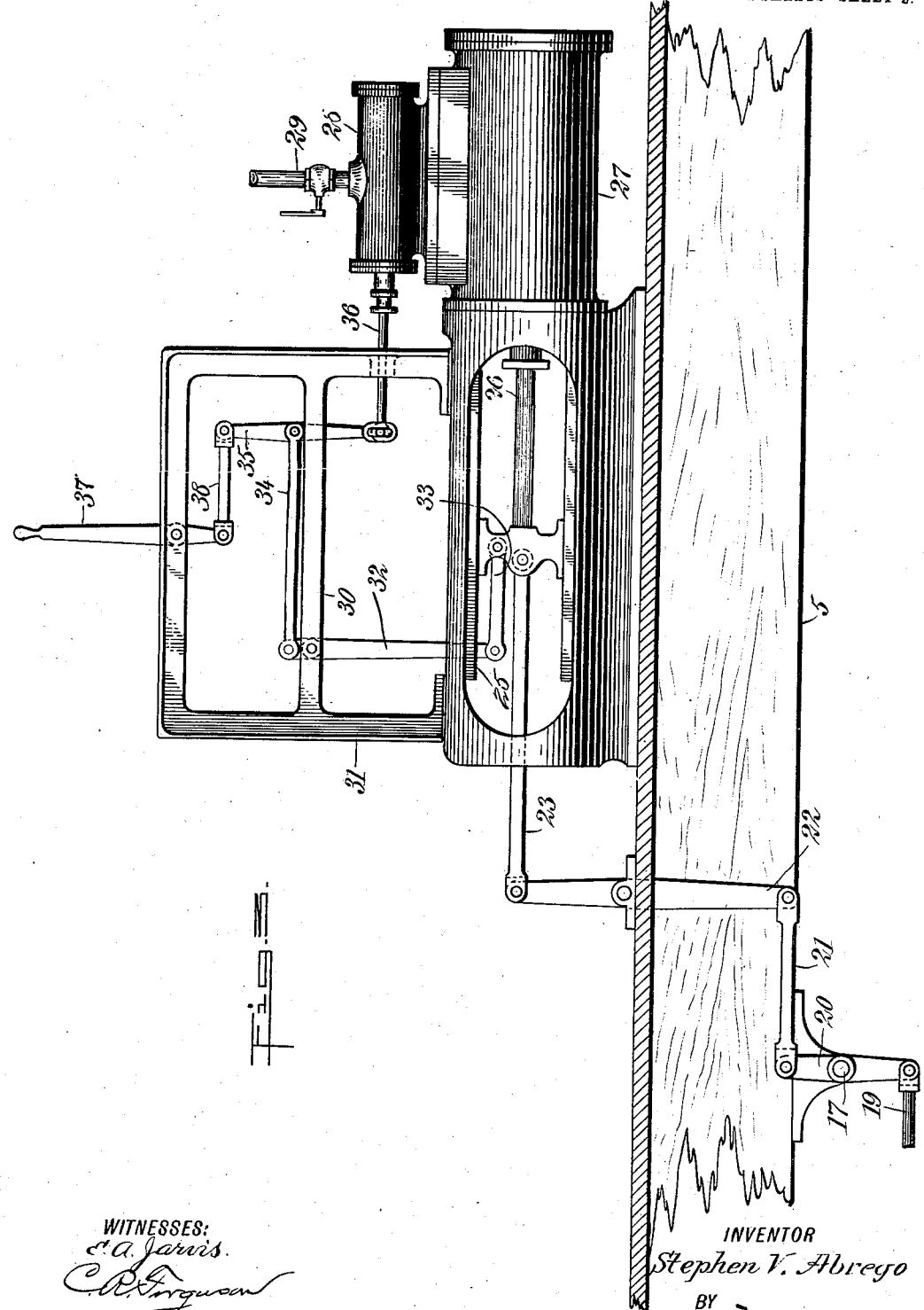
WITNESSES:
INVENTOR
Stephen V. Abrego
BY
ATTORNEYS

UNITED STATES PATENT OFFICE.

STEPHEN VALENTINE ABREGO, OF LAKE CHARLES, LOUISIANA.

STEAM-SAWYER.

No. 849,958.      Specification of Letters Patent.      Patented April 9, 1907.

Application filed May 6, 1905. Serial No. 259,128.

*To all whom it may concern:*

Be it known that I, STEPHEN VALENTINE ABREGO, a citizen of the United States, and a resident of Lake Charles, in the parish of Calcasieu and State of Louisiana, have invented a new and Improved Steam-Sawyer, of which the following is a full, clear, and exact description.

This invention relates to improvements in devices for controlling the valves of a steam-feed for sawmill-carriages, the object being to provide a steam-actuating mechanism for shifting the valves, thus relieving an attendant or sawyer from a greater part of the work now required to shift the valves manually.

I will describe a steam-sawyer embodying my invention and then point out the novel features in the appended claims.

Reference is to be had to the accompanying drawings, forming a part of this specification, in which similar characters of reference indicate corresponding parts in all the figures.

Figure 1 is a side elevation of a steam-sawyer embodying my invention. Fig. 2 is a section on the line 2 2 of Fig. 1. Fig. 3 is an elevation of the valve-controlling motor, and Fig. 4 is a section through the controlling-motor.

Referring to the drawings, 5 designates the bed of the mill, 6 the carriage movable thereon, and 7 the saw. Arranged along the bed is a cylinder 8, in which the piston operates in the usual manner, the stem 9 of the piston being connected to a hanger 10 on the carriage 6. A steam-supply pipe 11 has branch connections 12 13 with the opposite ends of the cylinder 8, and in these branches are valves 14 15, the two valves being connected together by a rod 16, so that when the rod is moved in one direction one valve will be open and the other closed.

From a rock-shaft 17 an arm 18 extends downward and has a link connection 19 with the rod 16. On the outer end of the rock-shaft 17 is an upwardly-extended arm 20, having a link connection 21 with the lower end of a lever 22, pivoted at about its center to the bed-frame. From the upper end of the lever 22 a rod 23 extends to a connection with a cross-head 24, movable on ways 25, and this cross-head is engaged or connected to a piston-rod 26 of a piston operating in the steam-cylinder 27. On the steam-cylinder 27 is a steam-chest and valve-casing 28, which receives steam through a pipe 29, and the valve therein may be of the ordinary slide type.

Pivoted to a cross-bar 30 of an upwardly-extended frame 31 is a lever 32, the lower end of which has a link connection 33 with the cross-head 24. The upper end of the lever 32 is quite short, as its movement is limited. This upper end has pivotally connected to it a link 34, and mounted to swing on this link 34 is a lever 35, the lower end of said lever 35 having connection with the valve-stem 36. Pivoted to the upper cross-bar of the frame 31 is a valve-actuating lever 37, the lower end of which is connected to the upper end of the lever 35 through the medium of a link 38.

In the operation in starting the device an attendant by throwing the lever 37 to the left will shift the valve in the casing 28 to the left, opening the ports to the right-hand end of the cylinder 27. The steam therein will force the piston forward, which will swing the lever 22, causing the opening of the valve 14 and the closing of the valve 15. Therefore steam will enter the right-hand end of the cylinder 8, causing the carriage to move forward. By the movement of the cross-head in the direction above indicated, the lever 32 will be swung, causing the lever 35 also to swing and move the slide-valve toward the right-hand end of the casing 28 to close the port leading into the right-hand end of the cylinder 27. Thus it will be seen that the engine or motor not only controls the valves for supplying steam to the cylinder 8, but also controls the slide-valve to cause an automatic cut-off. Of course when the piston in the cylinder 27 reaches its forward stroke and the slide-valve is in the right-hand end of the casing 28 steam will be admitted to the left-hand end of the cylinder 27 and the valves reversed, so that the carriage carrying the log will return to its first position.

As for a clearer understanding of the operation the following may be added: The valve 39 is of the piston type—that is, it is round, so as to make it a balance-valve by having steam against both ends. The valve is the reverse of an ordinary engine-valve, as it takes steam at one end, but it exhausts at the other end, and when the operator throws the lever 37 forward the piston on the stem 26 moves until the automatic lever operates the valve to close the exhaust, and steam is admitted in the opposite end of the cylinder until the pressure becomes equal at both ends, and then the piston comes to a stop. When the operator again moves his lever 37 to a central position, the piston will move from a central position in its cylinder back or forward and will stop, according to the position of the said lever 37, for when the piston arrives at a corresponding position the automatic lever will cut off the exhaust and equalize both ends.

Having thus described my invention, I claim as new and desire to secure by Letters Patent—

A device for shifting the valves for controlling the admission of steam to a motor for operating a sawmill-carriage, comprising a steam-engine, a cross-head having connection with the stem of the piston in the engine, a connection between said cross-head and said controlling-valves, a slide-valve for controlling the admission of steam to the engine-cylinder, a stem extended from the slide-valve, a lever having connection at its lower end with said cross-head, a link extended from the upper end of said lever, another lever pivoted between its ends to said link and having a connection at its lower end with the slide-valve stem, a manually-operated lever, and a link connection between said manually-operated lever and the upper end of the lever having connection with the valve-stem.

In testimony where of I have signed my name to this specification in the presence of two subscribing witnesses.

STEPHEN VALENTINE ABREGO.

Witnesses:
B. BROWN,
THAD MAYO.